(12) United States Patent
Hwang et al.

(10) Patent No.: US 9,920,824 B1
(45) Date of Patent: Mar. 20, 2018

(54) POWER TRANSMISSION APPARATUS FOR VEHICLE

(71) Applicant: Hyundai Motor Company, Seoul (KR)

(72) Inventors: Seong Wook Hwang, Gunpo-si (KR); Hyun Sik Kwon, Seoul (KR); Wonmin Cho, Hwaseong-si (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/371,780

(22) Filed: Dec. 7, 2016

(30) Foreign Application Priority Data

Sep. 29, 2016 (KR) .......................... 10-2016-0125558

(51) Int. Cl.
*F16H 37/04* (2006.01)
*F16H 3/00* (2006.01)
*F16H 3/66* (2006.01)
*F16H 3/093* (2006.01)
*F16H 37/06* (2006.01)

(52) U.S. Cl.
CPC ........... *F16H 37/042* (2013.01); *F16H 3/006* (2013.01); *F16H 3/093* (2013.01); *F16H 3/66* (2013.01); *F16H 37/065* (2013.01); *F16H 2003/007* (2013.01); *F16H 2037/048* (2013.01); *F16H 2200/0073* (2013.01); *F16H 2200/2007* (2013.01); *F16H 2200/2035* (2013.01)

(58) Field of Classification Search
CPC . F16H 3/006; F16H 3/093; F16H 3/66; F16H 2003/007; F16H 37/04; F16H 37/042; F16H 37/065; F16H 2037/048; F16H 2200/0073; F16H 2200/2007
See application file for complete search history.

(56) References Cited

U.S. PATENT DOCUMENTS

| | | | |
|---|---|---|---|
| 7,044,013 | B2 | 5/2006 | Ahrens |
| 2006/0266144 | A1 | 11/2006 | Schafer et al. |
| 2012/0065016 | A1 | 3/2012 | Tamai et al. |

(Continued)

FOREIGN PATENT DOCUMENTS

| | | |
|---|---|---|
| JP | 4361794 B2 | 11/2009 |
| JP | 4566199 B2 | 8/2010 |

(Continued)

*Primary Examiner* — Edwin A Young
(74) *Attorney, Agent, or Firm* — Slater Matsil, LLP

(57) ABSTRACT

A power transmission apparatus may include an first shifting member receiving the torque of the engine from the second input shaft, changing the torque of the engine into first and second preliminarily shifted torques, and outputting the first and second preliminarily shifted torques; a second shifting member receiving the torque of the engine from the third input shaft, changing the torque of the engine into third and fourth preliminarily shifted torques, and outputting the third and fourth preliminarily shifted torques; and a third shifting member changing the torque of the engine selectively transmitted from the first input shaft and the first preliminarily shifted torque to the fourth preliminarily shifted torque selectively transmitted from the first shifting member or the second shifting member into eleven forward speed stages and one reverse speed stage, and outputting the eleven forward speed stages and the one reverse speed stage.

14 Claims, 3 Drawing Sheets

(56) References Cited

U.S. PATENT DOCUMENTS

| | | | |
|---|---|---|---|
| 2012/0160044 A1* | 6/2012 | Kahl | F16H 3/006 74/330 |
| 2015/0040705 A1* | 2/2015 | Robinette | F16H 3/093 74/330 |
| 2015/0167803 A1 | 6/2015 | Lee et al. | |
| 2015/0362044 A1* | 12/2015 | Hemphill | F16H 3/006 74/329 |

FOREIGN PATENT DOCUMENTS

| | | |
|---|---|---|
| KR | 101181746 B1 | 9/2012 |
| KR | 20140133112 A | 11/2014 |
| KR | 20150071605 A | 6/2015 |

\* cited by examiner

FIG. 2

| Speed stage | CL1 | CL2 | CL3 | CL4 | BK | SL1 D1/7/9 | SL1 N | SL1 D3/5/11 | SL2 D2/6/10 | SL2 N | SL2 R |
|---|---|---|---|---|---|---|---|---|---|---|---|
| REV | △ | △ | | | | | | | | | ● |
| D1 | △ | | | | ● | ● | | | | ● | |
| D2 | | △ | | | ● | | ● | | ● | | |
| D3 | △ | | | | ● | | | ● | | ● | |
| D4 | | | | ● | ● | | ● | | | ● | |
| D5 | △ | | | ● | ● | | | ● | | ● | |
| D6 | | △ | | ● | | | ● | | ● | | |
| D7 | △ | | | ● | | ● | | | | ● | |
| D8 | | | ● | | | | ● | | | ● | |
| D9 | △ | | ● | | | ● | | | | ● | |
| D10 | | △ | ● | | | | ● | | ● | | |
| D11 | △ | | ● | | | | | ● | | ● | |

POWER TRANSMISSION APPARATUS FOR VEHICLE

CROSS-REFERENCE TO RELATED APPLICATIONS

This application claims priority to and the benefit of Korean Patent Application No. 10-2016-0125558 filed in the Korean Intellectual Property Office on Sep. 29, 2016, the entire contents of which are incorporated herein by reference.

TECHNICAL FIELD

The present invention relates to a power transmission apparatus for a vehicle.

BACKGROUND

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

The DCT includes two clutch devices and a gear train of a manual transmission. The DCT selectively transmits torque input from an engine to two input shafts through two clutches, changes the torque selectively transmitted to the two input shafts through the gear train, and outputs the changed torque.

The DCT is used to realize a compact transmission achieving a forward speed stage higher than a fifth forward speed stage. The DCT is used as an automated manual transmission that does not require a driver's manual manipulation by controlling two clutches and synchronizing devices by a controller.

Compared with an automatic transmission with planetary gear sets, the DCT has excellent power delivery efficiency, simplifies change and addition of components for achieving multiple gear stages, and improves fuel economy.

The above information disclosed in this Background section is only for enhancement of understanding of the background of the invention and therefore it may contain information that does not form the prior art that is already known in this country to a person of ordinary skill in the art.

SUMMARY

The present invention relates to a power transmission apparatus for a vehicle. More particularly, embodiments of the present invention relate to a power transmission apparatus for a vehicle that realizes eleven forward speed stages and one reverse speed stage using two synchronizers and two planetary gear sets.

Embodiments of the present invention provide a power transmission apparatus for a vehicle having advantages of achieving eleven forward speed stages, realizing multiple speed stage, and improving fuel economy by adding two planetary gear sets to a DCT including two synchronizer.

Another embodiment of the present invention provides a power transmission apparatus for a vehicle having further advantages of simplifying an interior layout and minimizing weight of the power transmission apparatus by reducing the number of components, and of improving fuel economy by achieving eleven forward speed stages and one reverse speed stage with two synchronizers and two planetary gear sets.

A power transmission apparatus for a vehicle according to an exemplary embodiment of the present invention may include a first input shaft connected to an engine and a second input shaft enclosing the first input shaft without rotational interference with the first input shaft and selectively receiving torque of the engine through a first clutch. A third input shaft encloses the second input shaft without rotational interference with the second input shaft and selectively receiving the torque of the engine through a second clutch. A first power delivery shaft is disposed in parallel with the second input shaft. A first shifting member receives the torque of the engine from the second input shaft, changing the torque of the engine into first and second preliminarily shifted torques, and outputs the first and second preliminarily shifted torques. A second shifting member receives the torque of the engine from the third input shaft, changes the torque of the engine into third and fourth preliminarily shifted torques, and outputs the third and fourth preliminarily shifted torques. A third shifting member changes the torque of the engine selectively transmitted from the first input shaft and the first preliminarily shifted torque to the fourth preliminarily shifted torque selectively transmitted from the first shifting member or the second shifting member into eleven forward speed stages and one reverse speed stage, and outputs the eleven forward speed stages and the one reverse speed stage.

The first shifting member may include a 1/7/9 drive gear and a 3/5/11 drive gear rotatably disposed on the second input shaft. A first synchronizer operably connects the 1/7/9 drive gear or the 3/5/11 drive gear to the second input shaft selectively. A 1/7/9 driven gear is fixedly disposed on the first power delivery shaft and engaged with the 1/7/9 drive gear. A 3/5/11 driven gear is fixedly disposed on the first power delivery shaft and engaged with the 3/5/11 drive gear.

The first power delivery shaft may transmit the torque of the engine selectively transmitted through the 1/7/9 driven gear or the 3/5/11 driven gear to the third shifting member.

The second shifting member may include a second power delivery shaft disposed in parallel with the third input shaft and an idle shaft transmitting the torque of the engine transmitted from the second power delivery shaft to the first power delivery shaft.

A second synchronizer operably connecting a 2/6/10 drive gear or a reverse drive gear to the second power delivery shaft selectively may be disposed on the second power delivery shaft, and a power delivery driven gear engaged with a power delivery drive gear of the third input shaft may be fixedly disposed on the second power delivery shaft.

The reverse drive gear may be engaged with a 3/5/11 drive gear of the first shifting member.

A 2/6/10 driven gear engaged with the 2/6/10 drive gear may be fixedly disposed on the idle shaft, and an idle output gear engaged with a 3/5/11 driven gear of the first shifting member may be fixedly disposed on the idle shaft.

The third shifting member may include a first planetary gear set including a first sun gear, a first planet carrier, and a first ring gear as rotation elements thereof. A second planetary gear set includes a second sun gear, a second planet carrier, and a second ring gear as rotation elements thereof. four rotation shafts are directly connected to at least one rotation element among the rotation elements of the first planetary gear set and the second planetary gear set; and friction elements including clutches are selectively connecting two rotation shafts among the four rotation shafts to the first input shaft respectively and a brake selectively connecting one rotation shaft among the fourth rotation shafts to a transmission housing.

The four rotation shafts may include a first rotation shaft directly connected to the first sun gear, selectively connected to the first input shaft, and selectively connected to the transmission housing. A second rotation shaft directly connects the first planet carrier to the second ring gear and is directly connected to an output shaft. A third rotation shaft directly connects the first ring gear to the second planet carrier and is selectively connected to the first input shaft. A fourth rotation shaft is directly connected to the second sun gear and directly connected to the first power delivery shaft.

Each of the first planetary gear set and the second planetary gear set may be a single pinion planetary gear set.

A first intermediate drive gear may be fixedly disposed on the first input shaft, a first intermediate driven gear engaged with the first intermediate drive gear may be disposed at a radial exterior of the first rotation shaft without rotational interference with the first rotation shaft, and the first rotation shaft may be selectively connected to the first intermediate driven gear.

A second intermediate drive gear may be disposed at a radial exterior of the first input shaft without rotational interference with the first input shaft, the first input shaft may be selectively connected to the second intermediate drive gear, and a second intermediate driven gear engaged with the second intermediate drive gear may be fixedly disposed on the third rotation shaft.

The friction elements may include: a third clutch selectively connecting the first rotation shaft to the first input shaft; a fourth clutch selectively connecting the third rotation shaft to the first input shaft; and the brake selectively connecting the first rotation shaft to the transmission housing.

The first power delivery shaft may be a hollow shaft and may enclose the output shaft without rotational interference with the output shaft.

The exemplary embodiment of the present invention may achieve eleven forward speed stages and one reverse speed stage by adding two planetary gear sets to a DCT provided with two synchronizers. Therefore, multiple speed stages are achieved and fuel economy is improved.

In addition, an interior layout may be simplified; length and weight of the DCT may be minimized by reducing the number of components.

In addition, since even-numbered speed stages and odd-numbered speed stages are achieved by turns by alternately operating two clutches, smooth shift may be achieved.

The effects which may be obtained or predicted by the exemplary embodiment of the present invention will be directly or implicitly disclosed in the detailed description of the exemplary embodiments of the present invention. That is, various effects which are predicted by the exemplary embodiment of the present invention will be described in the detailed description to be described below.

BRIEF DESCRIPTION OF THE DRAWINGS

FIG. 2 is an operational chart of a power transmission apparatus for a vehicle according to an exemplary embodiment of the present invention.

Figure 1:
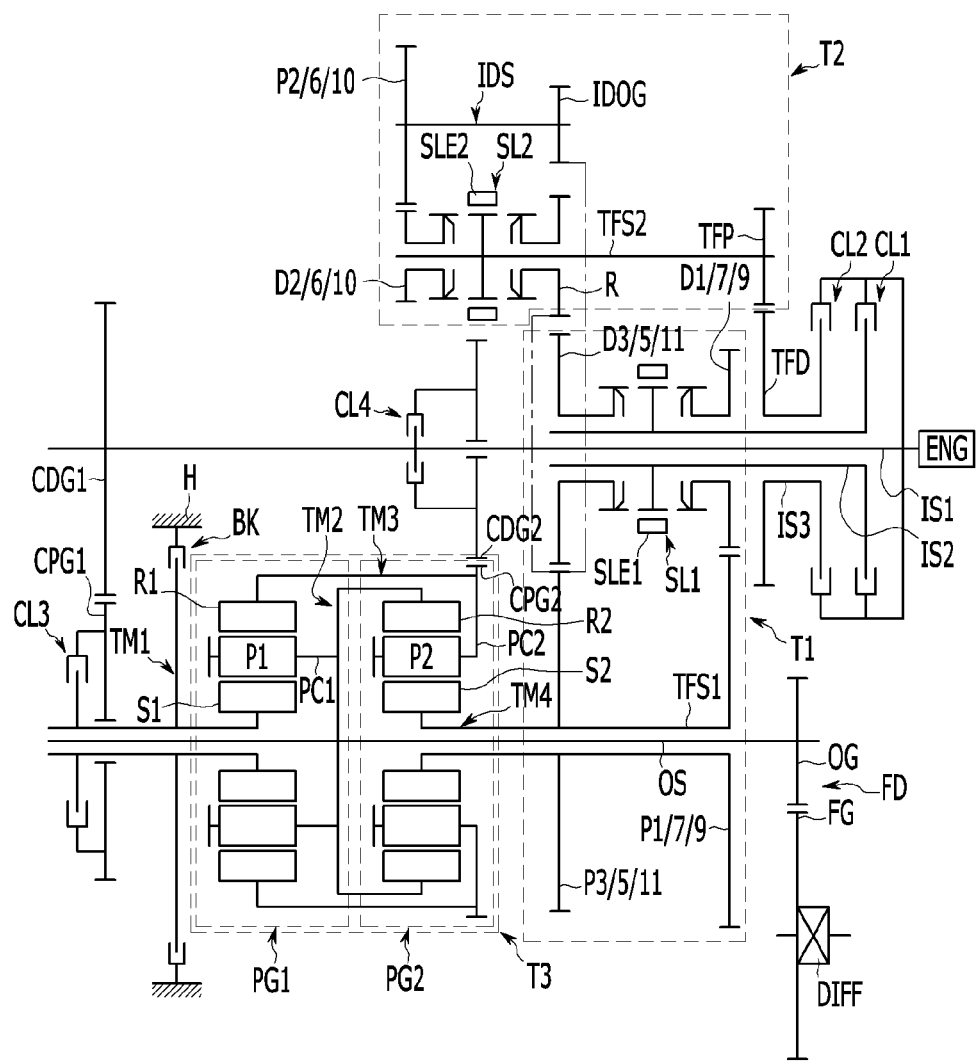
FIG. 1 is a schematic diagram of a power transmission apparatus for a vehicle according to an exemplary embodiment of the present invention.

The following reference symbols are used in conjunction with the drawings:
BK: brake
CDG1, CDG2: first and second intermediate drive gears
CPG1, CPG2: first and second intermediate driven gears
C1A, CL2, CL3, CL4: first, second, third, and fourth clutches
D1/7/9: 1/7/9 drive gear
D2/6/10: 2/6/10 drive gear
D3/5/11: 3/5/11 drive gear
IS1, IS2, IS3: first, second, and third input shafts
OS: output shaft
P1/7/9: 1/7/9 driven gear
P2/6/10: 2/6/10 driven gear
P3/5/11: 3/5/11 driven gear
PG1, PG2: first, second planetary gear set
R: reverse drive gear
S1A, SL2: first and second synchronizers
TFS1, TFS2: first and second power delivery shafts
TM1, TM2, TM3, TM4: first, second, third, and fourth rotation shafts

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts which are not related with the description are omitted for clearly describing the exemplary embodiments of the present invention and like reference numerals refer to like or similar elements throughout the specification.

In the following description, dividing names of components into first, second and the like is to divide the names because the names of the components are the same as each other and an order thereof is not particularly limited.

FIG. 1 is a schematic diagram of a power transmission apparatus for a vehicle according to an exemplary embodiment of the present invention.

Referring to FIG. 1, torque of an engine ENG that is a power source is changed into four preliminarily shifted torques through a first shifting member T1 and a second shifting member T2 and the four preliminarily shifted torques are transmitted to a third shifting member T3 in a power transmission apparatus according to an exemplary embodiment of the present invention. The four preliminarily shifted torques, together with the torque of the engine ENG directly input to the third shifting member T3 is changed into eleven forward speed stages and a reverse speed stage, and the eleven forward speed stages and the reverse speed stage are output.

The engine ENG that is the power source may be a gasoline engine or a diesel engine using fossil fuel.

The torque generated in the engine ENG is transmitted to the third shifting member T3, the second shifting member T2, and the first shifting member T1 through first, second, and third input shafts IS1, IS2, and IS3.

The first input shaft IS1 is directly connected to an output side of the engine ENG and selectively transmits torque of the engine ENG to the third shifting member T3.

The second input shaft IS2 is a hollow shaft, encloses the first input shaft IS1 without rotational interference therewith, is selectively connected to the output side of the engine ENG through a first clutch CL1, and is selectively transmits the torque of the engine ENG to the first shifting member T1.

The third input shaft IS3 is a hollow shaft, encloses the second input shaft IS2 without rotational interference therewith, is selectively connected to the output side of the engine ENG through the second clutch CL2, and selectively transmits the torque of the engine ENG to the second shifting member T2.

The first shifting member T1 includes a first power delivery shaft TFS1 disposed in parallel with the second input shaft IS2, a 1/7/9 drive gear D1/7/9, a 3/5/11 drive gear D3/5/11, a first synchronizer S1A disposed on the second input shaft IS2, a 1/7/9 driven gear P1/7/9 engaged with the 1/7/9 drive gear D1/7/9, and a 3/5/11 driven gear P3/5/11 engaged with the 3/5/11 drive gear D3/5/11.

The 1/7/9 drive gear D1/7/9 and the 3/5/11 drive gear D3/5/11 are rotatably disposed on the second input shaft IS2, and the 1/7/9 driven gear P1/7/9 and the 3/5/11 driven gear P3/5/11 are fixedly disposed on the first power delivery shaft TFS1.

The first synchronizer S1A operably connects the 1/7/9 drive gear D1/7/9 or the 3/5/11 drive gear D3/5/11 to the second input shaft IS2 selectively.

The first power delivery shaft TFS1 transmits torque selectively transmitted through the 1/7/9 driven gear P1/7/9 or the 3/5/11 driven gear P3/5/11 to the third shifting member T3.

Therefore, the first shifting member T1 generates a first preliminarily shifted torque for achieving a first forward speed stage, a seventh forward speed stage and a ninth forward speed stage, and a second preliminarily shifted torque for achieving a third forward speed stage, a fifth forward speed stage and eleventh forward speed stage. Gear ratio at the second preliminarily shifted torque is 1.0. Therefore, the same rotation speed as that of the engine ENG is output at the second preliminarily shifted torque.

The second shifting member T2 includes a second power delivery shaft TFS2 disposed in parallel with the third input shaft IS3 and an idle shaft IDS transmitting torque transmitted from the second power delivery shaft TFS2 to the first power delivery shaft TFS1.

A second synchronizer is disposed on the second power delivery shaft TFS2, and a power delivery driven gear TFP engaged with a power delivery drive gear TFD of the third input shaft IS3 is fixedly disposed on the second power delivery shaft TFS2.

A 2/6/10 drive gear D2/6/10 and a reverse drive gear R are rotatably disposed on the second power delivery shaft TFS2.

The second synchronizer SL2 operably connects the 2/6/10 drive gear D2/6/10 or the reverse drive gear R to the second power delivery shaft TFS2 selectively, and the reverse drive gear R is engaged with the 3/5/11 drive gear D3/5/11.

A 2/6/10 driven gear P2/6/10 engaged with the 2/6/10 drive gear (D2/6/10) is fixedly disposed on the idle shaft IDS, and an idle output gear (IDOG) for transmitting torque of the idle shaft IDS to the 3/5/11 driven gear P3/5/11 is fixedly disposed on the idle shaft IDS. The idle output gear IDOG is engaged with the 3/5/11 driven gear P3/5/11.

Therefore, the second shifting member T2 generates a third preliminarily shifted torque for achieving a second forward speed stage, a sixth forward speed stage and tenth forward speed stage, and a fourth preliminarily shifted torque for achieving a reverse speed stage.

The third shifting member T3 includes first and second planetary gear sets PG1 and PG2, and friction elements including two clutches CL3 and CL4, and one brake BK.

The first planetary gear set PG1 is a single pinion planetary gear set and includes a first sun gear S1, a first planet carrier PC1 rotatably supporting a first pinion P1 externally meshed with the first sun gear S1, and a first ring gear R1 internally meshed with the first pinion P1 as rotation elements thereof.

The second planetary gear set PG2 is a single pinion planetary gear set and includes a second sun gear S2, a second planet carrier PC2 rotatably supporting a second pinion P2 externally meshed with the second sun gear S2, and a second ring gear R2 internally meshed with the second pinion P2 as rotation elements thereof.

The first planet carrier PC1 is directly connected to the second ring gear R2, the first ring gear R1 is directly connected to the second planet carrier PC2, and the first and second planetary gear sets PG1 and PG2 include four rotation shafts TM1 to TM4.

The four rotation shafts TM1 to TM4 will be described in detail.

The first rotation shaft TM1 is directly connected to the first sun gear S1, is selectively connected to the first input shaft IS1, and is selectively connected to a transmission housing H to be operated as a selective fixed element.

The second rotation shaft TM2 directly connects the first planet carrier PC1 to the second ring gear R2 and is directly connected to an output shaft OS to be continuously operated as an output element.

The third rotation shaft TM3 directly connects the first ring gear R1 to the second planet carrier PC2 and is selectively connected to the first input shaft IS1.

The fourth rotation shaft TM4 is directly connected to the second sun gear S2 and is directly connected to the first power delivery shaft TFS1.

The first sun gear S1 directly connected to the first rotation shaft TM1 is selectively connected to the transmission housing H through the brake BK.

A first intermediate drive gear CDG1 for selectively connecting the first rotation shaft TM1 to the first input shaft IS1 is fixedly disposed on the first input shaft IS1, a first intermediate driven gear CPG1 engaged with the first intermediate drive gear CDG1 is disposed at a radial exterior of the first rotation shaft TM1 without rotational interference with the first rotation shaft TM1, and the first rotation shaft TM1 is selectively connected to the first intermediate driven gear CPG1 by operation of the third clutch CL3. Therefore, torque of the first input shaft IS1 is selectively transmitted to the first rotation shaft TM1.

In addition, a second intermediate drive gear CDG2 for selectively connecting the third rotation shaft TM3 to the first input shaft IS1 is disposed at a radial exterior of the first input shaft IS1, the first input shaft IS1 is selectively connected to the second intermediate drive gear CDG2 by operation of the fourth clutch CL4, and a second intermediate driven gear CDG2 engaged with the second intermediate drive gear CDG2 is fixedly disposed on the third rotation shaft. Therefore, torque of the first input shaft IS1 is selectively transmitted to the third rotation shaft TM3.

The output shaft OS directly connected to the second rotation shaft TM2 transmits the torque output from the third shifting member T3 to a final reduction gear apparatus FD including a differential apparatus DIFF.

The first power delivery shaft TFS1 is a hollow shaft and encloses the output shaft OS without rotational interference therewith. An output gear OG fixedly disposed on the output shaft OS is engaged with a final reduction gear FG of the final reduction gear apparatus FD.

Since the first and second synchronizers SL1 and SL2 are well known to a person of ordinary skill in the art, detailed description thereof will be omitted. In addition, first and second sleeves SLE1 and SLE2 applied respectively to the first and second synchronizers SL1 and SL2, as well known to a person of ordinary skill in the art, are operated by additional actuators (not shown) and the actuators are controlled by a transmission control unit.

Figure 3:
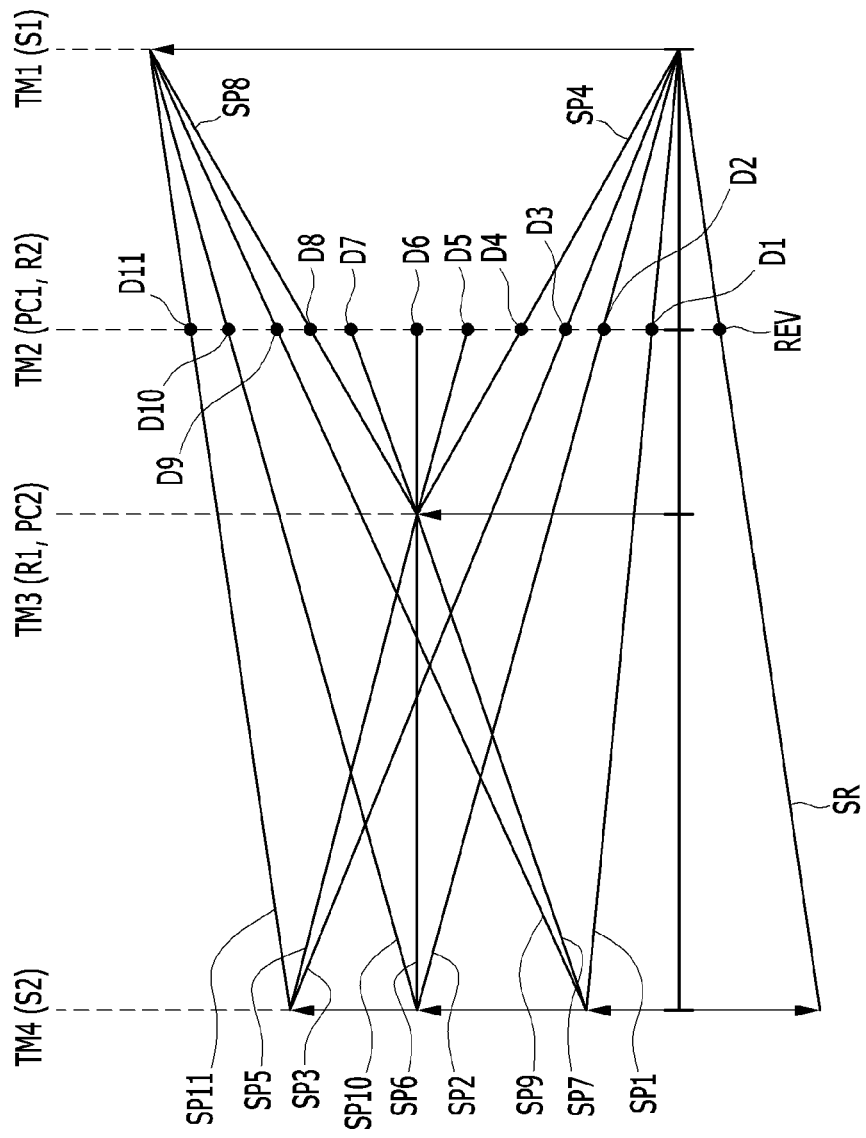
FIG. 3 is a lever diagram of a power transmission apparatus for a vehicle according to an exemplary embodiment of the present invention.

FIG. 2 is an operational chart of a power transmission apparatus for a vehicle according to an exemplary embodiment of the present invention, and FIG. 3 is a lever diagram of a power transmission apparatus for a vehicle according to an exemplary embodiment of the present invention. Referring to FIG. 2 and FIG. 3, shifting processes of the power transmission apparatus will be described in detail.

A reverse speed stage will be described now.

As shown in FIG. 2, the reverse drive gear R is operably connected to the second power delivery shaft TFS2 through the sleeve SLE2 of the second synchronizer SL2, and the second clutch CL2 and the brake BK are operated at the reverse speed stage REV.

Therefore, the torque of the engine ENG is shifted into the fourth preliminarily shifted torque through the second clutch CL2, the third input shaft IS3, the power delivery drive gear TFD, the power delivery driven gear TFP, the second power delivery shaft TFS2, the reverse drive gear R, the 3/5/11 drive gear D3/5/11, the 3/5/11 driven gear P3/5/11, and the first power delivery shaft TFS1, and the fourth preliminarily shifted torque is input to the fourth rotation shaft TM4 of the third shifting member T3 as inverse rotation speed.

As shown in FIG. 3, since the first rotation shaft TM1 is operated as the fixed element by the operation of the brake BK in a state that the fourth preliminarily shifted torque is input to the fourth rotation shaft TM4, a reverse shift line SR formed in the third shifting member T3. Therefore, a gear ratio of REV is output through the second rotation shaft TM2 that is an output member.

A first forward speed stage will be described now.

As shown in FIG. 2 the 1/7/9 drive gear D1/7/9 is operably connected to the second input shaft IS2 through the sleeve SLE1 of the first synchronizer SL1, and the first clutch CL1 and the brake BK are operated at the first forward speed stage D1.

Therefore, the torque of the engine ENG is shifted into the first preliminarily shifted torque through the first clutch CL1, the second input shaft IS2, the 1/7/9 drive gear D1/7/9, the 1/7/9 driven gear P1/7/9, and the first power delivery shaft TFS1, and the first preliminarily shifted torque is input to the fourth shaft TM4 of the third shifting member T3.

As shown in FIG. 3, since the first rotation shaft TM1 is operated as the fixed element by the operation of the brake BK in a state that the first preliminarily shifted torque is input to the fourth rotation shaft TM4, a first shift line SP1 is formed in the third shifting member T3. Therefore, a gear ratio D1 is output through the second rotation shaft TM2 that is the output member.

A second forward speed stage will be described now.

As shown in FIG. 2, the 2/6/10 drive gear D2/6/10 is operably connected to the second power delivery shaft TFS2 through the sleeve SLE2 of the second synchronizer SL2, and the second clutch CL2 and the brake BK are operated at the second forward speed stage D2.

Therefore, the torque of the engine ENG is shifted into the third preliminarily shifted torque through the second clutch CL2, the third input shaft IS3, the power delivery drive gear TFD, the power delivery driven gear TFP, the second power delivery shaft TFS2, the 2/6/10 drive gear D2/6/10, the 2/6/10 driven gear P2/6/10, the idle shaft IDS, the idle output gear IDOG, the 3/5/11 driven gear P3/5/11, the first power delivery shaft TFS1, and the third preliminarily shifted torque is input to the fourth rotation shaft TM4 of the third shifting member T3.

As shown in FIG. 3, since the first rotation shaft TM1 is operated as the fixed element by the operation of the brake BK in a state that the third preliminarily shifted torque is input to the fourth rotation shaft TM4, a second shift line SP2 is formed in the third shifting member T3. Therefore, a gear ratio of D2 is output through the second rotation shaft TM2 that is the output member.

A third forward speed stage will be described now.

As shown in FIG. 2, the 3/5/11 drive gear D3/5/11 is operably connected to the second input shaft IS2 through the sleeve SLE1 of the first synchronizer SL1, and the first clutch CIA and the brake BK are operated at the third forward speed stage D3.

Therefore, the torque of the engine ENG is shifted into the second preliminarily shifted torque through the first clutch CIA, the second input shaft IS2, the 3/5/11 drive gear D3/5/11, the 3/5/11 driven gear P3/5/11, and the first power delivery shaft TFS1, and the second preliminarily shifted torque is input to the fourth rotation shaft TM4 of the third shifting member T3.

As shown in FIG. 3, since the first rotation shaft TM1 is operated as the fixed element by the operation of the brake BK in a state that the second preliminarily shifted torque is input to the fourth rotation shaft TM4, a third shift line SP3 is formed in the third shifting member T3. Therefore, a gear ratio of D3 is output through the second rotation shaft TM2 that is the output member.

A fourth forward speed stage will be described now.

As shown in FIG. 2, both of the first and second synchronizers SL1 and SL2 maintain neutral states, and the fourth clutch CL4 and the brake are operated at the fourth forward speed stage D4.

Therefore, the torque of the ENG is input to the third rotation shaft TM3 of the third shifting member T3 through the first input shaft IS1, the fourth clutch CL4, the second intermediate drive gear CDG2, and the second intermediate driven gear CPG2.

As shown in FIG. 3, since the first rotation shaft TM1 is operated as the fixed element by the operation of the brake BK in a state that the torque of the engine ENG is input to the third rotation shaft TM3, a fourth shift line SP4 is formed in the third shifting member T3. Therefore, a gear ratio D4 is output through the second rotation shaft TM2 that is the output member.

A fifth forward speed stage will be described now.

As shown in FIG. 2 the 3/5/11 drive gear D3/5/11 is operably connected to the second input shaft IS2 through the sleeve SLE1 of the first synchronizer SL1, and the first clutch CIA and the fourth clutch CL4 are operated at the fifth forward speed stage D5.

Therefore, the torque of the engine ENG is shifted into the second preliminarily shifted torque through the first clutch CIA, the second input shaft IS2, the 3/5/11 drive gear D3/5/11, the 3/5/11 driven gear P3/5/11, and the first power delivery shaft TFS1, and the second preliminarily shifted torque is input to the fourth rotation shaft TM4 of the third shifting member T3.

In addition, the torque of the engine ENG is input to the third rotation shaft TM3 of the third shifting member T3 through the first input shaft IS1, the fourth clutch CL4, the second intermediate drive gear CDG2, and the second intermediate driven gear CPG2 without rotation speed change.

As shown in FIG. 3, since the second preliminarily shifted torque is input to the fourth rotation shaft TM4 and the torque of the engine ENG is input to the third rotation shaft TM3, a fifth shift line SP5 is formed in the third shifting member T3. Therefore, a gear ratio of D5 is output through the second rotation shaft TM2 that is the output member.

A sixth forward speed stage will be described now.

As shown in FIG. 2, the 2/6/10 drive gear D2/6/10 is operably connected to the second power delivery shaft TFS2 through the sleeve SLE2 of the second synchronizer SL2, and the second clutch CL2 and the fourth clutch CL4 are operated at the sixth forward speed stage D6.

Therefore, the torque of the engine ENG is shifted into the third preliminarily shifted torque through the second clutch CL2, the third input shaft IS3, the power delivery drive gear TFD, the power delivery driven gear TFP, the second power delivery shaft TFS2, the 2/6/10 drive gear D2/6/10, the 2/6/10 driven gear P2/6/10, the idle shaft IDS, the idle output gear IDOG, the 3/5/11 driven gear P3/5/11, the first power delivery shaft TFS1, and the third preliminarily shifted torque is input to the fourth rotation shaft TM4 of the third shifting member T3.

In addition, the torque of the engine ENG is input to the third rotation shaft TM3 of the third shifting member T3 through the first input shaft IS1, the fourth clutch CL4, the second intermediate drive gear CDG2, and the second intermediate driven gear CPG2 without rotation speed change.

As shown in FIG. 3, since the third preliminarily shifted torque is input to the fourth rotation shaft TM4 and the torque of the engine ENG is input to the third rotation shaft TM3, a sixth shift line SP6 is formed in the third shifting member T3. Therefore, a gear ratio of D6 is output through the second rotation shaft TM2 that is the output member.

A seventh forward speed stage will be described now.

As shown in FIG. 2, the 1/7/9 drive gear D1/7/9 is operably connected to the second input shaft IS2 through the sleeve SLE1 of the first synchronizer SL1, and the first clutch CIA and the fourth clutch CL4 are operated at the seventh forward speed stage D7.

Therefore, the torque of the engine ENG is shifted into the first preliminarily shifted torque through the first clutch CIA, the second input shaft IS2, the 1/7/9 drive gear D1/7/9, the 1/7/9 driven gear P1/7/9, and the first power delivery shaft TFS1, and the first preliminarily shifted torque is input to the fourth shaft TM4 of the third shifting member T3.

In addition, the torque of the engine ENG is input to the third rotation shaft TM3 of the third shifting member T3 through the first input shaft IS1, the fourth clutch CL4, the second intermediate drive gear CDG2, and the second intermediate driven gear CPG2 without rotation speed change.

As shown in FIG. 3, since the first preliminarily shifted torque is input to the fourth rotation shaft TM4 and the torque of the engine ENG is input to the third rotation shaft TM3, a seventh shift line SP7 is formed in the third shifting member T3. Therefore, a gear ratio of D7 is output through the second shaft TM2 that is the output member.

An eighth forward speed stage will be described now.

As shown in FIG. 2, both of the first and second synchronizers S1A and SL2 maintain neutral states, and the third clutch CL3 and the fourth clutch CL4 are operated at the eighth forward speed stage D8.

Therefore, the torque of the engine ENG is input to the first rotation shaft TM1 of the third shifting member T3 through the first input shaft IS1, the first intermediate drive gear CDG1, the second intermediate driven gear CPG1, and the third clutch CL3 without rotation speed change.

In addition, the torque of the engine ENG is input to the third rotation shaft TM3 of the third shifting member T3 through the first input shaft IS1, the fourth clutch CL4, and the second intermediate drive gear CDG2 with rotation speed change according to gear ratios of the second intermediate drive gear CDG2 and the second intermediate driven gear CPG2.

As shown in FIG. 3, since the torque of the engine ENG is input to the first rotation shaft TM1 and the third rotation shaft TM3, an eighth shift line SP8 is formed in the third shifting member T3. Therefore, a gear ratio of D8 is output through the second rotation shaft TM2 that is the output member.

A ninth forward speed stage will be described now.

As shown in FIG. 2 the 1/7/9 drive gear D1/7/9 is operably connected to the second input shaft IS2 through the sleeve SLE1 of the first synchronizer S1A, and the first clutch CIA and the third clutch CL3 are operated at the ninth forward speed stage D9.

Therefore, the torque of the engine ENG is shifted into the first preliminarily shifted torque through the first clutch CIA, the second input shaft IS2, the 1/7/9 drive gear D1/7/9, the 1/7/9 driven gear P1/7/9, and the first power delivery shaft TFS1, and the first preliminarily shifted torque is input to the fourth shaft TM4 of the third shifting member T3.

In addition, torque of the engine ENG is input to the first rotation shaft TM1 of the third shifting member T3 through the first input shaft IS1, the first intermediate drive gear CDG1, the first intermediate driven gear CPG1, and the third clutch CL3.

As shown in FIG. 3, since the first preliminarily shifted torque is input to the fourth rotation shaft TM4 and the torque of the engine ENG is input to the first rotation shaft TM1, a ninth shift line SP9 is formed in the third shifting member T3. Therefore, a gear ratio of D9 is output through the second shaft TM2 that is the output member.

A tenth forward speed stage will be described now.

As shown in FIG. 2, the 2/6/10 drive gear D2/6/10 is operably connected to the second power delivery shaft TFS2 through the sleeve SLE2 of the second synchronizer SL2, and the second clutch CL2 and the third clutch CL3 are operated at the tenth forward speed stage D10.

Therefore, the torque of the engine ENG is shifted into the third preliminarily shifted torque through the second clutch CL2, the third input shaft IS3, the power delivery drive gear TFD, the power delivery driven gear TFP, the second power delivery shaft TFS2, the 2/6/10 drive gear D2/6/10, the 2/6/10 driven gear P2/6/10, the idle shaft IDS, the idle output gear IDOG, the 3/5/11 driven gear P3/5/11, the first power delivery shaft TFS1, and the third preliminarily shifted torque is input to the fourth rotation shaft TM4 of the third shifting member T3.

In addition, the torque of the engine ENG is input to the first rotation shaft TM1 of the third shifting member T3 through the first input shaft IS1, the first intermediate drive gear CDG1, the first intermediate driven gear CPG1, the third clutch CL3.

As shown in FIG. 3, since the third preliminarily shifted torque is input to the fourth rotation shaft TM4 and the torque of the engine ENG is input to the first rotation shaft TM1, a tenth shift line SP10 is formed in the third shifting member T3. Therefore, a gear ratio of D10 is output through the second rotation shaft TM2 that is the output member.

An eleventh forward speed stage will be described now.

As shown in FIG. 2, the 3/5/11 drive gear D3/5/11 is operably connected to the second input shaft IS2 through the sleeve SLE1 of the first synchronizer S1A, and the first clutch CIA and the third clutch CL3 are operated at the eleventh forward speed stage Dn.

Therefore, the torque of the engine ENG is shifted into the second preliminarily shifted torque through the first clutch CIA, the second input shaft IS2, the 3/5/11 drive gear D3/5/11, the 3/5/11 driven gear P3/5/11, and the first power delivery shaft TFS1, and the second preliminarily shifted torque is input to the fourth rotation shaft TM4 of the third shifting member T3.

In addition, the torque of the engine ENG is input to the first rotation shaft TM1 of the third shifting member T3 through the first input shaft IS1, the first intermediate drive gear CDG1, the first intermediate driven gear CPG1, and the third clutch CL3.

As shown in FIG. 3, since the second preliminarily shifted torque is input to the fourth rotation shaft TM4 and the torque of the engine ENG is input to the first rotation shaft TM1, an eleventh shift line SP11 is formed in the third shifting member T3. Therefore, a gear ratio of D11 is output through the second rotation shaft TM2 that is the output member.

The power transmission apparatus for a vehicle according to an exemplary embodiment of the present invention may achieve the reverse speed stage and the eleven forward speed stages by adding two planetary gear sets to a DCT provided with two synchronizers.

In addition, an interior layout may be simplified, length and weight of the DCT may be minimized by reducing the number of components.

In addition, since even-numbered speed stages and odd-numbered speed stages are achieved by turns by alternately operating two clutches, smooth shift may be achieved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power transmission apparatus for a vehicle, the power transmission apparatus comprising:
   a first input shaft connected to an engine;
   a second input shaft enclosing the first input shaft without rotational interference with the first input shaft and selectively receiving torque of the engine through a first clutch;
   a third input shaft enclosing the second input shaft without rotational interference with the second input shaft and selectively receiving the torque of the engine through a second clutch;
   a first power delivery shaft disposed in parallel with the second input shaft;
   a first shifting member configured to receive the torque of the engine from the second input shaft, to change the torque of the engine into first and second preliminarily shifted torques, and to output the first and second preliminarily shifted torques;
   a second shifting member configured to receive the torque of the engine from the third input shaft, to change the torque of the engine into third and fourth preliminarily shifted torques, and to output the third and fourth preliminarily shifted torques; and
   a third shifting member configured to change the torque of the engine selectively transmitted from the first input shaft and the first preliminarily shifted torque to the fourth preliminarily shifted torque selectively transmitted from the first shifting member or the second shifting member into eleven forward speed stages and one reverse speed stage, and to output the eleven forward speed stages and the one reverse speed stage.

2. The power transmission apparatus of claim 1, wherein the first shifting member comprises:
   a 1/7/9 drive gear and a 3/5/11 drive gear rotatably disposed on the second input shaft;
   a first synchronizer operably connecting the 1/7/9 drive gear or the 3/5/11 drive gear to the second input shaft selectively;
   a 1/7/9 driven gear fixedly disposed on the first power delivery shaft and engaged with the 1/7/9 drive gear; and
   a 3/5/11 driven gear fixedly disposed on the first power delivery shaft and engaged with the 3/5/11 drive gear.

3. The power transmission apparatus of claim 2, wherein the first power delivery shaft is configured to transmit the torque of the engine selectively transmitted through the 1/7/9 driven gear or the 3/5/11 driven gear to the third shifting member.

4. The power transmission apparatus of claim 1, wherein the second shifting member comprises:
   a second power delivery shaft disposed in parallel with the third input shaft; and
   an idle shaft configured to transmit the torque of the engine transmitted from the second power delivery shaft to the first power delivery shaft.

5. The power transmission apparatus of claim 4, further comprising:
   a second synchronizer operably connecting a 2/6/10 drive gear or a reverse drive gear to the second power delivery shaft selectively, the second synchronizer being disposed on the second power delivery shaft; and
   a power delivery driven gear engaged with a power delivery drive gear of the third input shaft, the power delivery driven gear being fixedly disposed on the second power delivery shaft.

6. The power transmission apparatus of claim 5, wherein the reverse drive gear is engaged with a 3/5/11 drive gear of the first shifting member.

7. The power transmission apparatus of claim 5, further comprising:
   a 2/6/10 driven gear engaged with the 2/6/10 drive gear and being fixedly disposed on the idle shaft; and
   an idle output gear engaged with a 3/5/11 driven gear of the first shifting member is fixedly disposed on the idle shaft.

8. The power transmission apparatus of claim 1, wherein the third shifting member comprises:
   a first planetary gear set including a first sun gear, a first planet carrier, and a first ring gear as rotation elements thereof;
   a second planetary gear set including a second sun gear, a second planet carrier, and a second ring gear as rotation elements thereof; and
   four rotation shafts directly connected to at least one rotation element among the rotation elements of the first planetary gear set and the second planetary gear set; and friction elements including clutches selectively connecting two rotation shafts among the four rotation shafts to the first input shaft respectively and a brake selectively connecting one rotation shaft among the four rotation shafts to a transmission housing.

9. The power transmission apparatus of claim 8, wherein the four rotation shafts comprise:
   a first rotation shaft directly connected to the first sun gear, selectively connected to the first input shaft, and selectively connected to the transmission housing;
   a second rotation shaft directly connecting the first planet carrier to the second ring gear and directly connected to an output shaft;
   a third rotation shaft directly connecting the first ring gear to the second planet carrier and selectively connected to the first input shaft; and
   a fourth rotation shaft directly connected to the second sun gear and directly connected to the first power delivery shaft.

10. The power transmission apparatus of claim 9, wherein both the first planetary gear set and the second planetary gear set are a single pinion planetary gear sets.

11. The power transmission apparatus of claim 9, wherein a first intermediate drive gear is fixedly disposed on the first input shaft, a first intermediate driven gear engaged with the first intermediate drive gear is disposed at a radial exterior of the first rotation shaft without rotational interference with the first rotation shaft, and the first rotation shaft is selectively connected to the first intermediate driven gear.

12. The power transmission apparatus of claim 9, wherein a second intermediate drive gear is disposed at a radial exterior of the first input shaft without rotational interference with the first input shaft, the first input shaft is selectively connected to the second intermediate drive gear, and a second intermediate driven gear engaged with the second intermediate drive gear is fixedly disposed on the third rotation shaft.

13. The power transmission apparatus of claim 9, wherein the friction elements comprise:
   a third clutch selectively connecting the first rotation shaft to the first input shaft;
   a fourth clutch selectively connecting the third rotation shaft to the first input shaft; and
   the brake selectively connecting the first rotation shaft to the transmission housing.

14. The power transmission apparatus of claim 9, wherein the first power delivery shaft is a hollow shaft and encloses the output shaft without rotational interference with the output shaft.

* * * * *